(12) United States Patent  
Nam et al.

(10) Patent No.: US 9,136,543 B2  
(45) Date of Patent: Sep. 15, 2015

(54) BATTERY SYSTEM HAVING BATTERY MODULE, THERMAL SWITCH, HEATING SOURCE AND PIN STRUCTURE

(75) Inventors: Sang-Cheol Nam, Seoul (KR); Ho-Young Park, Seoul (KR); Young-Chang Lim, Seoul (KR); Ki-Chang Lee, Seoul (KR); Kyu-Gil Choi, Seoul (KR); Ho-Sung Hwang, Gyeonggi-do (KR); Gi-Back Park, Gyeonggi-do (KR); Sung-Back Cho, Chungcheongnam-do (KR); Seung-Ho Kang, Daejeon-shi (KR); Hyun-Jin Ji, Gyeongsangnam-do (KR)

(73) Assignees: GS Energy Corporation, Seoul (KR); Agency for Defense Development, Daejeon (KR)

( * ) Notice: Subject to any disclaimer, the term of this patent is extended or adjusted under 35 U.S.C. 154(b) by 499 days.

(21) Appl. No.: 12/934,640

(22) PCT Filed: Apr. 24, 2008

(86) PCT No.: PCT/KR2008/002343  
§ 371 (c)(1), (2), (4) Date: Sep. 24, 2010

(87) PCT Pub. No.: WO2009/119933  
PCT Pub. Date: Oct. 1, 2009

(65) Prior Publication Data  
US 2011/0020689 A1   Jan. 27, 2011

(30) Foreign Application Priority Data

Mar. 25, 2008   (KR) .................. 10-2008-0027579

(51) Int. Cl.  
*H01M 10/50*   (2006.01)  
*H01M 6/36*   (2006.01)  
*H01M 6/50*   (2006.01)

(52) U.S. Cl.  
CPC .............. *H01M 6/36* (2013.01); *H01M 6/5038* (2013.01)

(58) Field of Classification Search  
None  
See application file for complete search history.

(56) References Cited

U.S. PATENT DOCUMENTS 4,047,292 A * 9/1977 Shaffer ........................... 29/878  
6,475,662 B1 * 11/2002 Spencer ......................... 429/112  
(Continued)

FOREIGN PATENT DOCUMENTS

JP   60-095861   5/1985  
JP   60095861 A *  5/1985  
(Continued)

OTHER PUBLICATIONS

International Search Report and Written Opinion in corresponding PCT Application No. PCT/KR2008/002343 dated Dec. 12, 2008.  
(Continued)

*Primary Examiner* — Ula C Ruddock  
*Assistant Examiner* — Daniel Gatewood  
(74) *Attorney, Agent, or Firm* — Mintz Levin Cohn Ferris Glovsky and Popeo, P.C.; Steven M. Jensen

(57) ABSTRACT

A battery system (100) having a heating element (124), a thermal switch (130), a battery module (140), and a pin structure (170) is disclosed. The battery system (100) comprises: a battery case (110) forming an internal space; a battery module (140) located in the battery case and including a battery; a heating element structure (120) located in the battery case (110) and increasing the temperature of the battery System by heat generated by an impact; and a pin structure (170) for concentrating and transferring an external impact to a pre- determined region of the heating element structure.

25 Claims, 4 Drawing Sheets

(56) References Cited

U.S. PATENT DOCUMENTS

| | | |
|---|---|---|
| 2003/0194602 A1* | 10/2003 | Daoud .......................... 429/112 |
| 2004/0070486 A1* | 4/2004 | Senda et al. .................. 337/405 |
| 2004/0137318 A1 | 7/2004 | Deckel et al. |
| 2007/0292748 A1 | 12/2007 | Deckel et al. |
| 2012/0119706 A1 | 5/2012 | Potanin |

FOREIGN PATENT DOCUMENTS

| | | |
|---|---|---|
| JP | 2001-357873 | 12/2001 |
| JP | 2009-523298 | 6/2009 |
| KR | 10-0782162 | 12/2007 |
| KR | 100782162 A * | 12/2007 |

OTHER PUBLICATIONS

Korean Notice of Grounds for Rejection dated Nov. 30, 2009 in corresponding Korean Patent Application No. 10-2008-0027579 (with English translation).

Notice of Grounds for Rejection transmitted Feb. 19, 2013, in corresponding Japanese Patent Application No. 2011-501700 (with English translation).

* cited by examiner

BATTERY SYSTEM HAVING BATTERY MODULE, THERMAL SWITCH, HEATING SOURCE AND PIN STRUCTURE

CROSS-REFERENCE TO RELATED APPLICATIONS

This application is the national stage application pursuant to 35 U.S.C. §371 of PCT application PCT/KR2008/002343, filed Apr. 24, 2008, which claims priority to Korean Patent Application No. 10-2008-0027579, filed Mar. 25, 2008. The contents of these applications are incorporated herein by reference in their entirety.

TECHNICAL FIELD

The present invention relates to a battery system having a heating element, a thermal switch, a battery module, and a pin structure. More particularly, the present invention relates to a battery system, which is connected to a current collector of a battery module manufactured using a battery, so that the battery being made of an solid electrolyte, thin film active materials maintains an inactivated state in normal times while showing the same battery performance as an ambient temperature over a wide temperature range including a low temperature within a very short rising time when it is electrically activated after melting a inserted metal sheet having a low melting point ($T_m$) due to an explosive powder initiated by an external impact and heat generated from a heating source ignited by energy from the explosive powder. Such a battery system can be used to prevent an abrupt decrease in voltage caused by internal resistance increase upon a high output current in a low temperature, which is one of the drawbacks of the thin filem battery using solid electrolytes.

BACKGROUND ART

Normally, in several types of reserve batteries, an liquid electrolyte is contained in a glass ampoule and electrodes are installed outside the glass ampoule. The glass ampoule is destroyed by an external impact, so that the electrolytes and the electrodes can contact each other to generate electricity. Although the reserve battery is preserved for an extended period of time, the property of the battery can be checked merely by contacting the electrolyte solution and both electrodes by destroying the glass ampoule. In addition, the time for inducing current (rising time) by contacting the electrolyte solution to both electrodes by destroying the glass ampoule is several hundreds of msec, which is relatively long. In addition, if the battery has a small size, the structure of having to inject the electrolyte solution into the glass ampoule is not easy to mass produce because the preparation process of the battery is complicated. Furthermore, the electrolyte used as a liquid solution shows strong toxicity, which may cause problems to the environment and reduce safety.

To overcome the above-described problems, it is preferable to use an all solid state thin film battery, rather than a battery with a glass ampoule. Most of the so-far well-known battery systems use a liquid electrolyte solution, and a battery system using a polymer electrolyte has been recently developed, in which case, too, a predetermined amount of liquid electrolyte has to be injected. In case such a battery is used, the capacity of the battery decreases with time due to self-discharge, and battery internal resistance gradually increases, thereby making difficult a power supply to an electronic device requiring an instantaneous high output. Among the existing activated battery systems, the one most advantageous in terms of self-discharge is a thin film battery, which is known to have a self discharge rate less than 2% per year. The thin film battery is made by instantaneously depositing a current collector, an anode, an electrolyte, a cathode, and a passivation film on a substrate of various types, including metal, ceramic, glass, etc, by a physical vapor deposition (PVD) or chemical vapor deposition (CVD). The thin film battery is very excellent in preservation during non-use of the battery and freely manufactured in a desired form according to a mask pattern because it uses a solid electrolyte. The currently used solid electrolyte has no problem when used in an ambient temperature or high temperature because its thickness is very thin, i.e., less than 2 μm. However, the lower the temperature in which the solid electrolyte is used, the lower the ionic conductivity of the solid electrolyte, thus causing an abrupt voltage drop due to battery internal resistance if a high output current is required. To overcome this phenomenon, a large number of batteries have to be connected in parallel to greatly reduce battery internal resistance. However, if there are spatial restrictions, this causes a lot of technical and economical difficulties in connecting a large number of batteries. Hence, it is necessary to introduce an appropriate method for overcoming these difficulties.

DISCLOSURE OF INVENTION

Technical Problem

It is an object of the present invention to provide a battery system which has the same battery performance as an ambient temperature by decreasing resistance in a thin film battery, which is a problem in a low temperature, by inserting a heating element into a battery case to generate heat and increase the temperature of the battery. In addition, a separate switch is required in the battery in order to keep the battery in an inactivated state during non-use of the battery as in the existing ampoule type battery, and, preferably, such a switch is comprised of an insulating film or insulator which has holes formed on a metal sheet having a relatively low melting point and excellent conductivity in normal times, such that the metal sheet in the switch structure melts by a high temperature upon heat generation from the heating element and connected to a lower end of the battery module.

Accordingly, the present invention has been made in consideration of the problems of an existing glass ampoule type battery having the conventional problems, and an object of the present invention is to provide a battery system which operates a thermal switch by heat generation of a heating element by an external impact, and exhibits the same battery performance as an ambient temperature by an increase in the temperature in a battery module.

Technical Solution

The present invention provides a battery system, comprising: a battery case forming an internal space; a battery module located in the battery case and including a battery; a heating element structure located in the battery case and increasing the temperature of the battery system by heat generated by an impact; and a pin structure for concentrating and transferring an external impact to a predetermined region of the heating element structure.

In another aspect of the present invention, the heating element structure comprises a heating source which generates heat by being activated by an explosive activated by an impact and an initiation energy of the explosive.

In another aspect of the present invention, the pin structure has a pin formed so as to concentrate an external impact to the site where the explosive is located.

In another aspect of the present invention, the battery system further comprises a guide ring for guiding the pin structure so that the pin of the pin structure can strike at a precise location.

In another aspect of the present invention, the pin structure is formed of either metal or ceramic.

In another aspect of the present invention, the battery system further comprises a thermal switch located between the battery module and the heating element structure, and activating the battery system upon heat generation of the heating element structure.

In another aspect of the present invention, the thermal switch comprises a metal sheet which melts upon heating and an insulating film for insulating the metal sheet and the battery module.

In another aspect of the present invention, the metal sheet is made of any one of the group consisting of indium, tin, lead, and alloys thereof.

In another aspect of the present invention, the insulating film has heat resistance with respect to heat generated from the heating source, and has holes formed thereon so that the metal sheet is melted and bonded to the battery module.

In another aspect of the present invention, the heating element structure comprises an explosive, a heating source, and a mold made of metal for housing the explosive and the heating source.

In another aspect of the present invention, the heating source is a pellet which is formed by pressing a mixture of a metal powder selected from the group consisting of Zr, B, Ti, and Fe and a powder selected from the group consisting of $KNO_3$, $KClO_4$, $Pb_3O_4$, $BaCrO_4$, and $SrO_2$.

In another aspect of the present invention, the explosive is located at the center side of the mold, and the heating source has a plurality of pellets arranged at the outer side of the mold along the circumference.

In another aspect of the present invention, the mold made of metal has holes formed at a top portion of the heating source to make heat transfer to the top portion easier.

In another aspect of the present invention, the battery system further comprises a metal mesh for preventing a molten metal sheet between the mold made of metal and the metal sheet from being introduced into the heating element structure through the holes at the top portion of the heating source.

In another aspect of the present invention, the heating element structure further comprises a heating element structure case made of flexible metal, and the mold made of metal is located in the heating element structure case. The heating element structure case functions to contain an explosive ignited by an impact and a heating source, such as a heat pellet, for generating heat from the explosive, and effectively transfers the impact to the explosive activated by an impact from a bottom portion.

In another aspect of the present invention, the mold made of metal and the heating element structure case comprise holes at the top portion of the heating source so as to directly transfer heat generated from the heating source to the thermal switch.

In another aspect of the present invention, the thermal switch comprises a metal sheet which melts upon heating, the battery module comprises a current collector formed at a bottom portion of the battery for supporting the battery, and the current collector is formed by depositing the material forming the metal sheet.

In another aspect of the present invention, the battery module comprises a thin film battery which is formed by sequentially depositing a current collector, a cathode, a solid electrolyte, and an anode onto a substrate.

In another aspect of the present invention, the battery module comprises a plurality of thin film batteries connected to each other by at least either one of parallel connection and serial connection of the thin film batteries.

In another aspect of the present invention, the substrate is made of one of nickel, stainless steel, copper, titanium, zirconium, alumina, silicon wafer, zirconia, mica, soda lime, quartz, and borosilicate glass.

In another aspect of the present invention, the battery module comprises either an insulating coating or an insulating film formed at a side surface for insulating from the battery case.

In another aspect of the present invention, the battery case further comprises a battery cover for hermetically sealing the battery system.

In another aspect of the present invention, the battery cover is made of metal, and the battery module further comprises: a current collector formed at a top portion of the battery; and an insulating film formed between the battery cover and the current collector.

In another aspect of the present invention, the battery system further comprises a connection terminal passing through the battery cover and providing a connection to the outside from the current collector.

In another aspect of the present invention, glass-to-metal sealing is provided between the connection terminal and the battery cover.

Advantageous Effects

The battery system provided in the present invention can overcome a long rising time, difficulties in the preparation process, the environmental problems, such as electrolyte leakage, and so on, which have been pointed out as the problems of the existing ampoule type battery.

Additionally, the battery system provided in the present invention can maintain an inactivated state in normal times by insertion of switch isolating the battery module from the battery case, activate the battery by heat generation of a heating element, and improve battery characteristics in a low temperature by increasing the temperature of the battery module.

Additionally, the battery system provided in the present invention is activated during use to operate the battery, and can show the same battery performance as an ambient temperature even under a low temperature by charging a heating element into the lower end and increasing the temperature of the battery module by a temperature increase caused by the heating element.

Additionally, the battery system provided in the present invention does not need to use a separate pin structure for an external impact by including a pin structure in the battery case.

MODE FOR THE INVENTION

Hereinafter, the present invention will be described in more detail with reference to the drawings.

Figure 1:
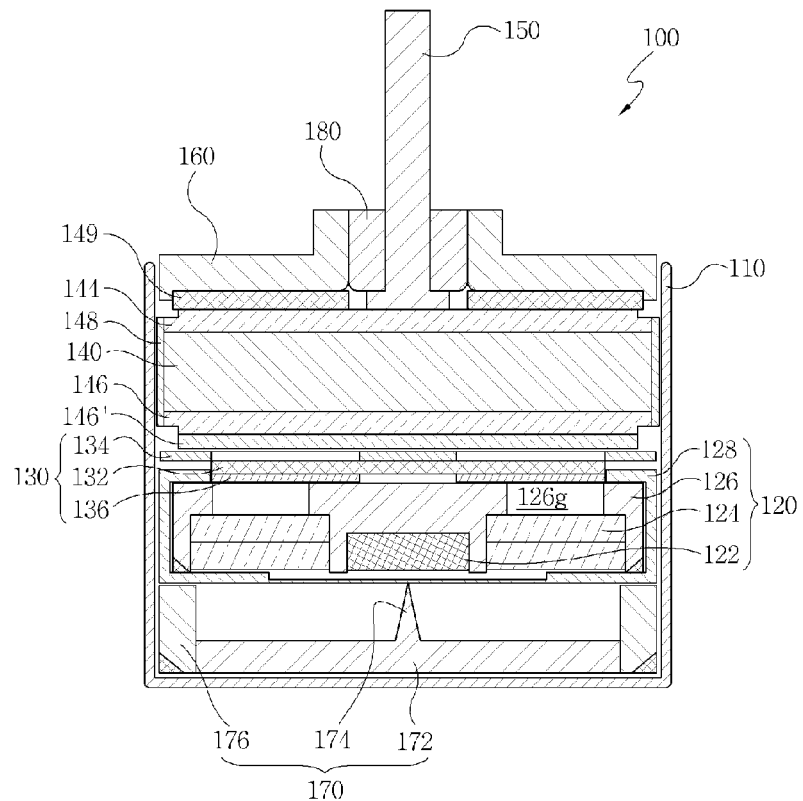
FIG. 1 is a view showing a battery system having a heating element, a thermal switch, and a battery module mounted therein.

FIG. 1 is a view showing a battery system according to one embodiment of the present invention. The battery system 100 according to the present invention has a pin structure 170, a heating element structure 120, a thermal switch 130, and a battery module 140 sequentially stacked from the bottom in a battery case.

The battery case 110 is made of a metal material, such as nickel, stainless steel, copper, and alloys thereof, and is formed in a cylindrical shape or box shape whose top portion is opened. The pin structure 170 is accommodated into the lowermost portion of the battery case 110, and the heating element structure 120 is located on top of the pin structure 170. The heating element structure 120 includes an explosive 122 initiated by an external impact and a heating source 124 ignited upon receipt of the initiation energy of the explosive. At this time, the heating source 124 is formed by vacuum-drying a fine metal powder, such as Zr, B, Ti, and Fe, less than 10 μm for more than six hours, and then uniformly mixing it with $KNO_3$, $KClO_4$, $Pb_3O_4$, $BaCrO_4$, $SrO_2$, etc. The mixed paste is produced in a pellet form by being pressed by a press, and used as the heating source 124. Preferably, the heating element structure 120 further includes a mold 126 made of metal for fixing the explosive 122 and the heating source 124. The mold 126 is generally produced by use of SUS. The explosive 122 initiated by an external impact is disposed in the center of the bottom portion of the mold 126, and a plurality of heating sources 124 produced in a pellet form is disposed on the outer periphery of the mold 126. At this time, the pin structure 170 has a disk 172 having a relatively large surface area for receiving as big an external impact as possible and a pin 174 projected on the disk 172 and for concentrating and transferring a shock to the explosive 122. Moreover, a guide ring 176 for guiding the movement of the disk 172 is installed on the outer periphery of the disk 172.

In addition, when the explosive 122 is initiated, the heating sources 124 are activated and ignited by the energy of the explosive 122, and the temperature of the battery system 100 is instantaneously increased. In addition, the mold 126 having the explosive 122 and the heating source fixed thereto is accommodated in a heating element structure case 128 made of metal. By the heating element structure case 128, it is possible to prevent the explosive 122 from falling from the mold 126. In order to easily transfer an external impact to the explosive 122, the heating element structure case 128 is preferably formed of a metal material having a relatively large flexibility, such as aluminum.

A thermal switch 130 is accommodated in the top portion of the heating element structure 120. The thermal switch 130 includes a metal mesh 136 located at the lowermost portion, i.e., placed right above the heating element structure 120, a metal sheet 132 located on top of the metal mesh 136, and an insulating film 134 for insulating the metal sheet and the battery module 140. With the battery system 100 reserved, the thermal switch 130 prevents the battery module 140 from being electrically connected to the battery case 110 through the mold 126 or heating element structure 128 of the heating element structure 120, thereby enabling the battery system to be reserved in an inactivated state. However, when the heating element structure 120 generates heat by an external impact, the metal sheet 132 is melted to electrically connect the battery module 140 and the battery case 110, thereby activating the battery system 110.

The battery module 140 is accommodated in the top portion of the thermal switch 130. The battery module 140 has a thin film battery (not shown) which is formed by sequentially depositing a current collector, a cathode, a solid electrolyte, and an anode onto various types of substrates, such as nickel, stainless steel, copper, titanium, zirconium, alumina, silicon wafer, zirconia, mica, soda lime, quartz, and borosilicate glass. The battery module 140 may have a plurality of unit thin film batteries, and can increase the storage capacity of the battery by connecting the thin film batteries in parallel or can increase the voltage of the battery by connecting the thin film batteries in series. In addition, the battery module 140 includes current collectors 144 and 146 made of metal formed on the top portion or bottom portion of the plurality of thin film batteries, and functions to support the thin film batteries, protect the thin film batteries from an external impact, and connect an anode terminal and a cathode terminal to the thin film batteries. In addition, the battery module 140 includes an insulating layer formed at a side surface of the battery module 140 to prevent the battery from short-circuiting due to contact with the battery case 110 made of metal. The insulating layer 148 may be an insulating coating 148 formed at a side surface of the battery module 140 or an insulating film to be attached to a side surface of the battery module 140. A connection terminal 150 is formed at the top portion of the battery module 140, i.e., at the upper current collector 144. The connection terminal 150 functions as electrode terminals of positive and negative polarities of the battery system 100 along with the battery case 110, and allows the battery system 100 to be connected to another apparatus and electronic circuits.

In addition, after the heating element structure 120, the thermal switch 130, the battery module 140, and the connection terminal 150 are accommodated in the battery case 110, a battery cover 160 is installed at the top portion in order to hermetically seal the battery system 100. The battery system 160 enables the battery system to be preserved for a long time by hermetically sealing the battery system 100. Generally, the battery cover 160 is formed of metal so that it can be welded to the battery case 110 made of metal, thereby increasing long-time preservation. At this time, in order to prevent the battery system 100 from short-circuiting due to contact between the battery cover 160 and the upper current collector 144, an insulating layer 149 is formed at the top portion of the upper current collector 144 except for the region contacted by the connection terminal 150. Further, in order to prevent the battery system 100 from short-circuiting due to contact between the connection terminal 150 and the battery cover 160 and increase the sealing property, glass-to-metal sealing is carried out between the connection terminal 150 and the battery cover 160.

Figure 2:
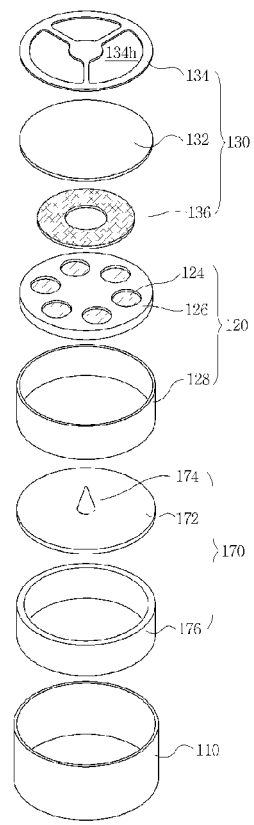
FIG. 2 is an exploded perspective view of the pin structure, the heating element structure, and the thermal switch.

FIG. 2 is an exploded perspective view of the pin structure, the heating element structure, and the thermal switch. The pin structure 170, the heating element structure 120, the thermal switch 130, and the battery module 140 are sequentially stacked in the battery case 100 from the bottom portion. The pin structure 170 is configured to strike the explosive 122 (shown in FIG. 1) located at the center of the heating element structure 120. The pin structure 170 includes a disk 172 for receiving a stroke from the outside, a pin 174 projected at the center of the disk 172 and for transferring a force to the explosive 122 (shown in FIG. 1), and a guide ring 176 located on the outer side of the disk 172 and for preventing shaking when striking the explosive 122 (shown in FIG. 1). The disk 172 and the 174 are integrally formed by metal, such as Al, Ni, SUS, W, Mo, Cu, and Fe, and/or ceramic, such as alumina and zirconia, and SUS, W, Mo, and so forth having a large density are more preferable because they can transfer a bigger impact to the explosive 122 (shown in FIG. 1).

A mold 126 made of SUS is inserted into the heating element structure case 128 made of aluminum. An explosive 122 (shown in FIG. 1) is placed at the center of the bottom portion of the mold 126, and a heating source 124 produced in a pellet form is disposed along the outer periphery of the mold 126. In one example, in case that a heat source 124 is produced by uniformly mixing 82 wt % Zr powder and 19 wt % BaCrO4 and pressing the mixture by a press, a calorie of more than 200 cal/g is released at a high temperature of more than 300° C. instantaneously upon heat generation. The top portion of the heating source 124 is opened to make easier heat transfer to the thermal switch 130. In other words, holes 126 are formed at the top portion of the mold 126 to make easier heat transfer to the thermal switch 130. In addition, the heating element structure case 128 also has holes formed at the top portion, or is produced in a manner that the top portion is opened, thereby making easier heat transfer to the thermal switch 130. A metal mesh 136 is located on top of the heating element structure 120. The metal mesh 136 is made of a metal having a high heat transfer rate, such as copper, and functions to rapidly transfer heat evenly to the metal sheet 132 from the heating element structure 120. At the same time, the metal mesh 136 functions to prevent a metal molten material formed by rapid melting of the metal mesh 126 from being discharged to the heating element structure 120. The metal sheet 132 is made of material, such as indium, tin, lead, and alloys thereof. When the metal sheet 132 is rapidly melted, the molten material is changed into the form of fine beads. The metal mesh 136 prevents this molten metal beads from being discharged to the heating element structure 120, thus making the molten material contact with with the battery module 140. An insulating film 134 having a thickness of several tens to several hundreds of μm is formed at the top portion of the metal sheet 132, thereby preventing the metal sheet 132 from contacting with the battery module 140 before the metal sheet 132 is melted by the heat transferred from the heating element structure. At this time, the insulating film 134 has at least one hole 134h for passing the molten metal sheet 132 through formed therein so that the metal sheet 132 melted by heat generation of the heating element structure 120 may contact with the battery module 140. Meanwhile, a depositional surface having a thickness of several to several tens of μm is formed of the same material as that of the metal sheet 132 at the bottom portion of a lower current collector 146 of the battery module 140 so that the molten metal sheet 132 may be easily attached thereto. The depositional surface uses the property that it is readily attachable to the same kind of material when the metal sheet 132 is molten, and can activate the battery system 100 more reliably.

Figure 3:
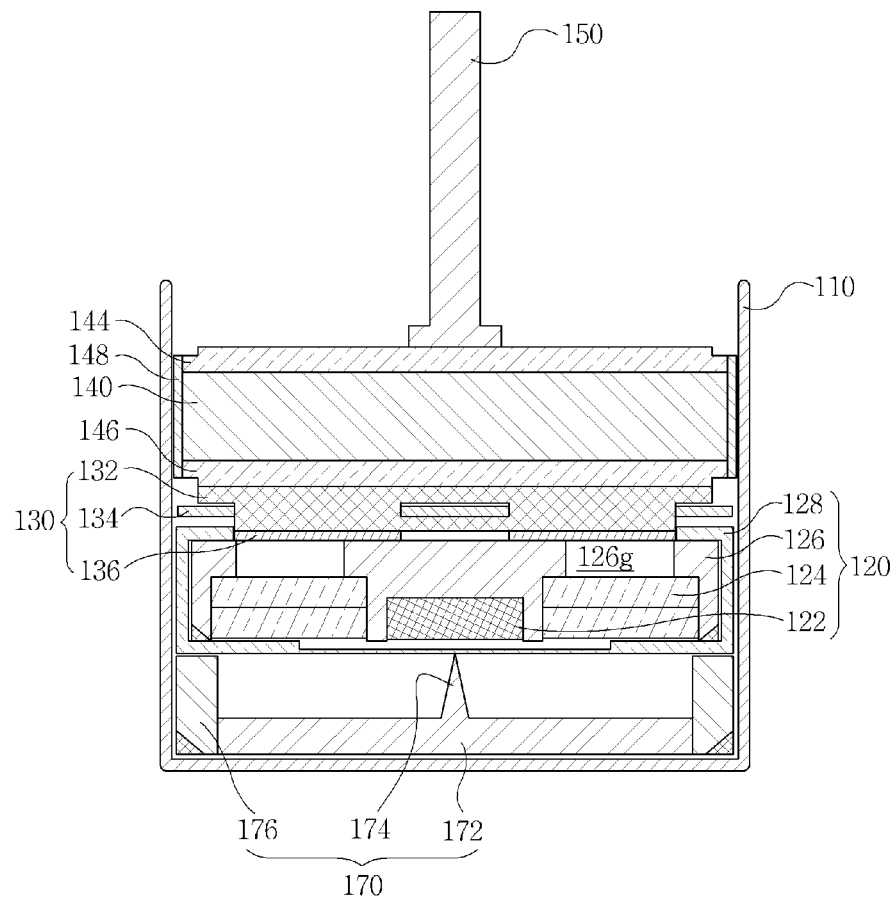
FIG. 3 is a view schematically showing the battery system being activated as the thermal switch is operated by an impact of the pin structure.

FIG. 3 is a view schematically showing the battery system being activated as the thermal switch is operated by an impact of the pin structure. The pin structure 170, heating element structure 120, thermal switch 130, and battery module 140 are sequentially stacked in the battery case 110 from the bottom portion. When an external impact is applied to the bottom portion of the battery case 110, the external impact is transferred to the pin structure 170. The disk 172 of the pin structure 170 is guided and moved by the guide ring 176 upon receipt of the external impact, and, upon movement, the projected pin 174 strikes the explosive 122 of the heating element structure 120, thereby initiating the explosive 122. The heating source 124 is ignited by the initiation energy of the explosive 122. The ignition of the heating source 124 instantaneously increases the temperature in the battery case 110 to more than 200° C. By the resulting high temperature, the metal sheet 132 made of a conductive metal material (e.g., indium, tin, lead, and alloys thereof) having a relatively low melting point is melted. The molten metal sheet 132 is attached to the lower current collector 146 of the battery module 140 through the hole 134h formed in the insulating film 134. Therefore, the lower current collector 146 of the battery module 140 is electrically connected, through the metal sheet 132, to the heating structure case 128 or metal mold 126 of the heating element structure made of a conductive metal material. In addition, the heating element structure case 128 or metal mold 126 is electrically connected to the battery case 110 made of a conductive metal material. Hence, when the battery system 100 is activated by the thermal switch 130, the battery case 110 functions as a positive electrode terminal or a negative electrode terminal. For example, if the heating element structure case 128 is formed so as to over the metal mold 126m the heating element structure case 128 and the battery case 110 are electrically connected, and if the heating element structure case 128 is not formed, the metal mold 126 and the battery case 110 are electrically connected.

Meanwhile, the ignition of the heating source 124 increases the temperature of the battery module 140, too. Especially, in the battery module 140 using a thin film battery, such a temperature increase serves to greatly reduce internal resistance of the battery module 140. Thus, the same performance of the battery system 100 as an ambient temperature can be implemented even under a low temperature or extremely low temperature environment.

Figure 4:
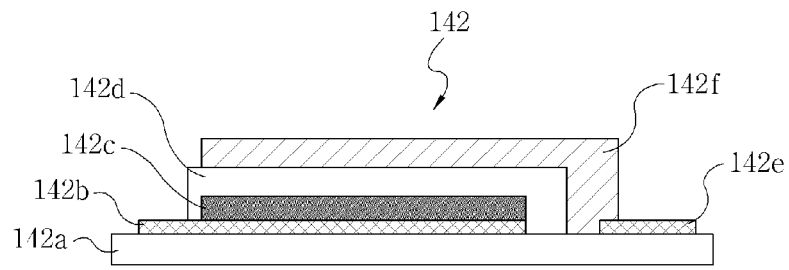
FIG. 4 is a cross sectional view showing a unit cell of a thin film battery constituting the battery module of FIG. 1.

FIG. 4 is a cross sectional view showing a unit cell of a thin film battery constituting the battery module of FIG. 1. The unit cell of the thin film battery 142 is formed by depositing an cathode current collector 142b, an cathode active material 142c and an amorphous glass solid ceramic electrolyte 142d, and a anode current collector 142e on a substrate 142a, such as metal, ceramic, glass, and a mica film by a sputtering method, and then depositing a lithium anode 142f thereon by thermal evaporation. At this time, if the substrate is metal, a separate insulating coating has to be provided over the bottom portion and side surfaces of the substrate to prevent short-circuiting upon battery connection. The battery module 140 (shown in FIG. 1) of this type can be used at a voltage or capacity higher than the unit cells by stacking a plurality of unit cells of the thin film battery 142, connecting them in series or in parallel.

Figure 5:
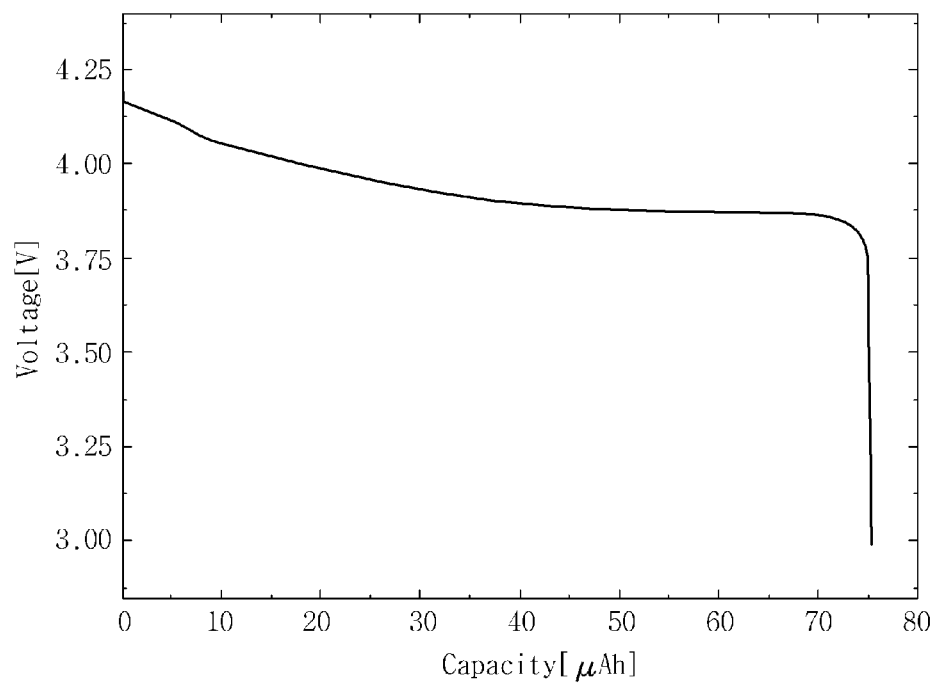
FIG. 5 shows a discharge curve in constant current discharge of the battery system whose heating element is in operation.

FIG. 5 shows a discharge curve in constant current discharge of an activated battery system. The battery module 140 produced by use of eleven unit cells of the thin film battery 142 (shown in FIG. 4) described in FIG. 4 is charged up to 4.2V, and then accommodated in the battery case 110 (shown in FIG. 1). Next, the battery system 100 is activated by generating heat by applying an impact from the outside to the heating element structure 120 (shown in FIG. 1), to observe the discharged state. When discharge is made up to 3.0V by applying a constant current of about 35 μA, a discharge capacity of about 7 μAh is shown. By this, it can be seen that eleven unit cells are well connected in a parallel state when considering that the discharge capacity of one unit cell is about 7 μAh. Also, it can be seen that a typical discharge curve of lithium (than oxide represents a first phase transition between hexagonal and monoclinic phases near 4.15V and 4.05 and a second phase transition between rhombohedral phases near 3.9V.

Figure 6:
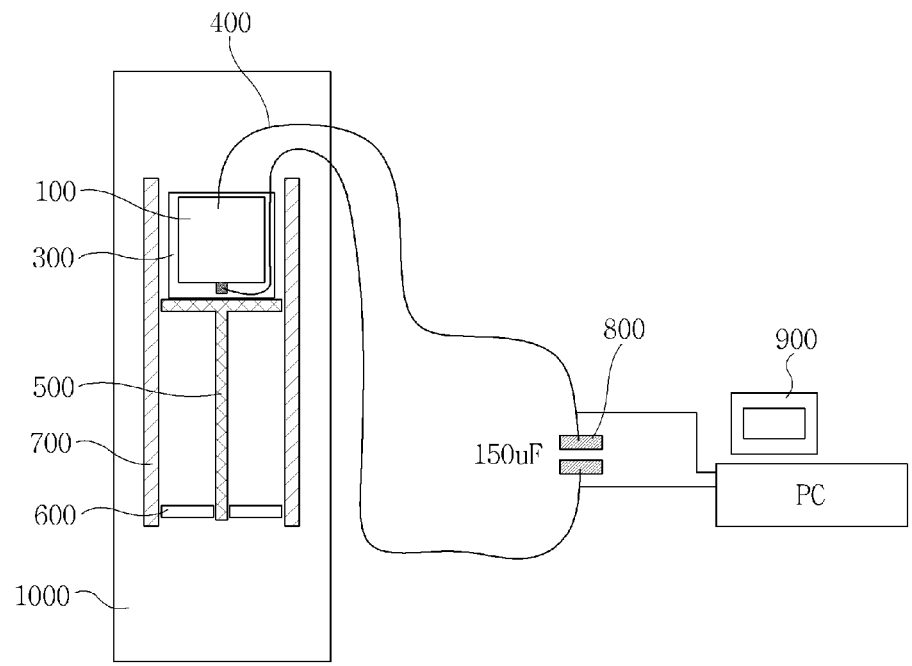
FIG. 6 relates to a battery activation test apparatus and an apparatus for connecting an activated battery to a capacitor and charging the same.

In order to check the phenomenon that a real electronic device is normally operated over a wide temperature range, such as an ambient temperature, a high temperature, and a low temperature, by use of the battery system described in detail in FIG. 1, as shown in FIG. 6, there is provided an impact apparatus which makes the battery system 100 collide against a lower support 600 by connecting the battery system 100 to a capacitor 800 by a conductor 400, supporting it by a separate support 300 and fixing it to a cylinder 500, and then instantaneously dropping it. This impact apparatus is a test apparatus for detecting the degree of battery activation by a pin structure inserted into the battery system. That is, the impact apparatus refers to an apparatus for measuring a capacitor charging voltage upon activation by connecting the capacitor 800 to the battery system 100.

In the battery system 100 having a battery module 140 (shown in FIG. 1), a heating element structure 120 (shown in FIG. 1), a thermal switch 130 (shown in FIG. 1), and a pin structure 170 (shown in FIG. 1), an anode and a cathode are connected to the capacitor 800 having an electrostatic capacity of 150 μF by an external conductor. At this time, the voltage of the capacitor 800 is measured in units of 10 msec through a separate computer 900. At an initial stage where the battery system 100 is connected to the capacitor 800, the battery module 140 (shown in FIG. 1) in the battery system 100 is disconnected to the battery case by the thermal switch 130, and thus the voltage of the capacitor 800 is 0V. When the support 300 to which the battery is fixed is rapidly lowered by the cylinder 500 to hit hard the lower support 600 for the purpose of battery activation, the battery system 100 receives a strong impact, and this impact leads to the result that the pin structure 170 (shown in FIG. 1) inserted into the battery system 100 strikes the impact activation explosive 122 (shown in FIG. 1) of the heating element structure 120 (shown in FIG. 1). Resultantly, the heating element 124 (shown in FIG. 1) is heated, and the thermal switch 130 (shown in FIG. 1) is connected by the heat, thereby activating the battery. For an experiment over a wide temperature range, such as an ambient, a high and low temperature etc a battery activation test apparatus is installed within a chamber 700 which is kept at a constant temperature and humidity, and the cylinder 500 moves in a perpendicular direction only.

Figure 7:
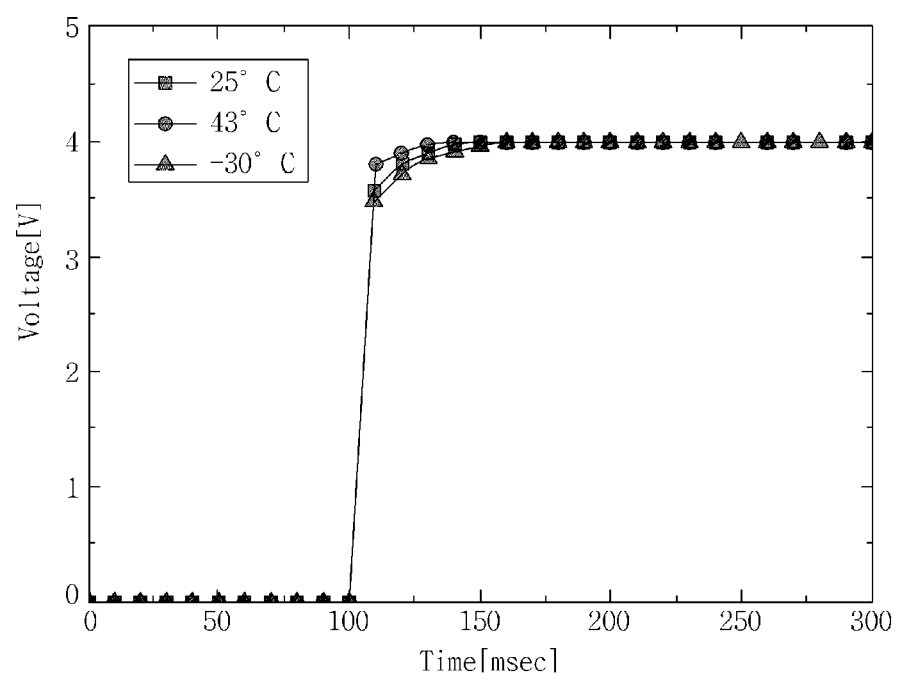
FIG. 7 illustrates the result of measuring the charging voltage of a capacitor upon charging the capacitor by use of batteries activated, respectively, at an ambient temperature, a high temperature, and a low temperature.

FIG. 7 illustrates the result of measuring the charging voltage of a capacitor upon charging the capacitor by use of batteries activated respectively at an ambient temperature, a high temperature, and a low temperature. This drawing shows the result of charging the capacitor 500 connected to the battery system 100 when the battery system 100 is actually activated by use of the battery activation test apparatus described in FIG. 6. It can be seen that, when the heating element is actually started up to normally operate the switch without considering the time for operating the thermal switch, the capacitor 500 is charged up to 3.6V within a very short time, i.e., 10 msec, in an ambient temperature, and charging is completed within 40 msec up to 4V, which is the OCV (open-circuit voltage) of the battery. From this, it can be found out that an activation time for circuit connection by melting the metal sheet 132 (shown in FIG. 2) after heat generation of the heating source 124 (shown in FIG. 1) by the an impact activation explosive 122 (shown in FIG. 1) is at a negligible level. As a result of a separate experiment, though not measured simultaneously with this experiment, the activation time for circuit connection by melting the metal sheet 132 (shown in FIG. 2) after heat generation of the heating source (shown in FIG. 1) by the an impact activation explosive 122 (shown in FIG. 1) is 30 to 40 msec, which is a very small numerical value, and does not exceed a maximum of 100 msec even in a low temperature of minus 30 degrees. Thus, it can be found out that, even if the rising time for operating the switch is taken into account, the capacitor is charged within a maximum of 80 msec in an ambient temperature. It can be seen that this numerical corresponds to the result of greatly reducing the activation time compared to the existing ampoule type battery. In a high temperature of 43° C., a slight increase in temperature is applied to the battery module 140 upon heat generation, and hence the charging voltage of the capacitor 500 (shown in FIG. 6) is 3.8V after 10 msec and charging is completed within 30 msec. In a low temperature of minus 30 degrees, the charging voltage of the capacitor is 3.4V after 10 msec, which slightly lower than those in an ambient temperature or high temperature, however, the charging time at 4V shows that charging is completed within 50 msec even in a low temperature. Even if the switch operation time in a low temperature obtained in a separate experiment is taken into account, capacitor charging is completed within a maximum of 105 msec.

The invention claimed is:

1. A battery system, comprising:
    a connection terminal configured to function as one electrode of the battery system;
    a battery case made of a conductive material, forming an internal space, and configured to function as an other electrode of the battery system;
    a battery module located in the battery case and electrically connected to the connection terminal;
    a heating element structure located in the battery case and generating heat by an external impact;
    a pin structure for concentrating and transferring the external impact to a predetermined region of the heating element structure, wherein the external impact is applied to the battery case and then transferred to the pin structure; and
    a thermal switch preventing the battery module from being electrically connected to the battery case, thereby enabling the battery system to be reserved, wherein the thermal switch is melted by the heat generated by the heating element structure, to electrically connect the battery module and the battery case, which causes the battery case to function as the other electrode of the battery system.

2. The battery system of claim 1, wherein the heating element structure comprises an explosive activated by the external impact and a heating source which generates heat by being activated by an initiation energy of the explosive.

3. The battery system of claim 2, wherein the pin structure has a pin formed so as to concentrate the external impact to the site where the explosive is located.

4. The battery system of claim 1, wherein the battery system further comprises a guide ring for guiding the pin structure so that the pin of the pin structure can strike at a precise location.

5. The battery system of claim 1, wherein the pin structure is formed of either metal or ceramic.

6. The battery system of claim 1, wherein the thermal switch is located between the battery module and the heating element structure.

7. The battery system of claim 6, wherein the thermal switch comprises a metal sheet which melts upon heating and an insulating film for insulating the metal sheet and the battery module.

8. The battery system of claim 7, wherein the metal sheet is made of any one of the group consisting of indium, tin, lead, and alloys thereof.

9. The battery system of claim 7, wherein the insulating film has heat resistance with respect to heat generated from the heating element structure, and has holes formed thereon so that the metal sheet is melted and bonded to the battery module.

10. The battery system of claim 1, wherein the heating element structure comprises an explosive, a heating source, and a mold made of metal for housing the explosive and the heating source.

11. The battery system of claim 10, wherein the heating source is a pellet which is formed by pressing a mixture of a metal powder selected from the group consisting of Zr, B, Ti, and Fe and a powder selected from the group consisting of $KNO_3$, $KClO_4$, $Pb_3O_4$, $BaCrO_4$, and $SrO_2$.

12. The battery system of claim 10, wherein the explosive is located at the center side of the mold, and the heating source has a plurality of pellets arranged at the outer side of the mold along the circumference.

13. The battery system of claim 12, wherein the mold made of metal has holes formed at a top portion of the heating source to make heat transfer to the top portion easier.

14. The battery system of claim 13, wherein the battery system further comprises a metal mesh for preventing a molten metal sheet between the mold made of metal and the metal sheet from being introduced into the heating element structure through the holes at the top portion of the heating source.

15. The battery system of claim 10, wherein the heating element structure further comprises a heating element structure case made of flexible metal, and the mold made of metal is located in the heating element structure case.

16. The battery system of claim 15, wherein the heating element structure case has holes formed at a top portion to make heat transfer to the top portion easier.

17. The battery system of claim 15, wherein the mold made of metal and the heating element structure case comprise holes at the top portion of the heating source so as to directly transfer heat generated from the heating source to the thermal switch.

18. The battery system of claim 1, wherein the thermal switch comprises a metal sheet which melts upon heating and an insulating film for insulating the metal sheet and the battery module,
the battery module comprises a current collector formed at a bottom portion of the battery for supporting the battery, and
the current collector is formed by depositing the material forming the metal sheet.

19. The battery system of claim 1, wherein the battery module comprises a plurality of thin film batteries connected to each other by at least either one of parallel connection and serial connection of the thin film batteries.

20. The battery system of claim 19, wherein the substrate is made of one of nickel, stainless steel, copper, titanium, zirconium, alumina, silicon wafer, zirconia, mica, soda lime, quartz, and borosilicate glass.

21. The battery system of claim 1, wherein the battery module comprises either an insulating coating or an insulating film formed at a side surface for insulating from the battery case.

22. The battery system of claim 1, wherein the battery case further comprises a battery cover for hermetically sealing the battery system.

23. The battery system of claim 22, wherein the battery cover is made of metal, and
the battery module further comprises:
a current collector formed at a top portion of the battery; and
an insulating film formed between the battery cover and the current collector.

24. The battery system of claim 23, further comprising a connection terminal passing through the battery cover and providing an electrical connection to the outside from the current collector.

25. The battery system of claim 24, wherein glass-to-metal sealing is provided between the connection terminal and the battery cover.

* * * * *